United States Patent [19]
Perl

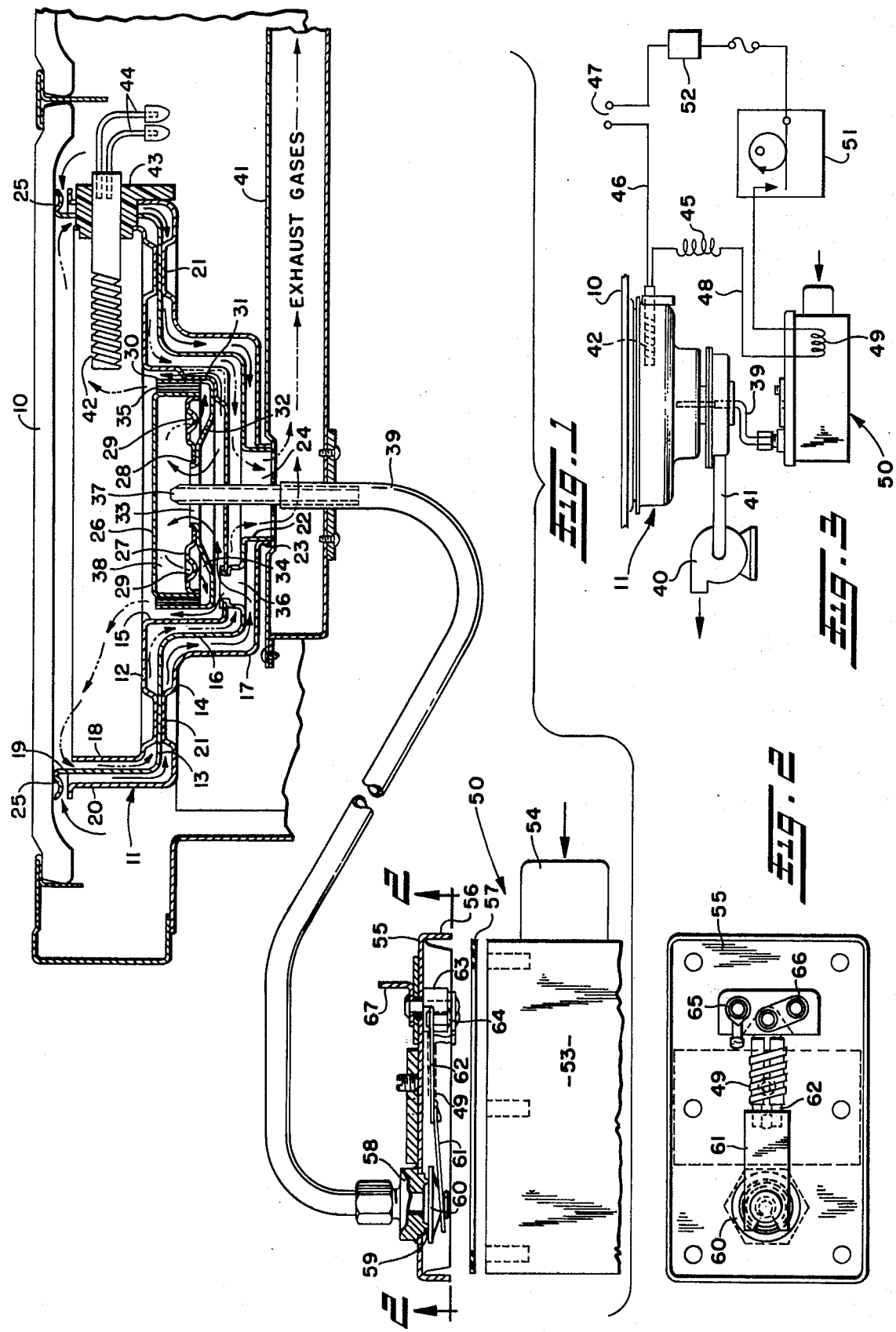

[11] 3,968,785
[45] July 13, 1976

[54] BLUE FLAME GAS SMOOTH TOP RANGE

[75] Inventor: Richard L. Perl, Mansfield, Ohio

[73] Assignee: The Tappan Company, Mansfield, Ohio

[22] Filed: Dec. 26, 1974

[21] Appl. No.: 536,352

Related U.S. Application Data

[60] Division of Ser. No. 432,547, Jan. 11, 1974, Pat. No. 3,870,457, which is a continuation of Ser. No. 223,451, Feb. 4, 1972, abandoned.

[52] U.S. Cl. ................................. 126/39 J; 431/66
[51] Int. Cl.² ............................................ F24C 3/04
[58] Field of Search ............... 431/66, 67, 254; 126/39 J

[56] References Cited
UNITED STATES PATENTS

| | | | |
|---|---|---|---|
| 3,137,339 | 6/1964 | Kading | 431/67 |
| 3,528,399 | 9/1970 | Perl | 126/21 A |
| 3,551,083 | 7/1968 | Michaels | 431/254 X |
| 3,698,378 | 10/1972 | Rosenberg et al. | 126/39 J |

Primary Examiner—Edward G. Favors
Attorney, Agent, or Firm—Donnelly, Maky, Renner & Otto

[57] ABSTRACT

A gas smooth top range in which the burner beneath the glass ceramic top is of powdered blue flame, rather than radiant, type. The burner in this and other possible environments is controlled by electric circuit means including a resistance igniter element having an appreciable energy output, electrically operated valve means in circuit with the igniter, and cycle control means for cyclically energizing the igniter and valve means at a rate that can be varied to regulate the heat output of the burner. Heat transfer structure is associated with the burner and arranged so that hot exhaust gases from the burner are effective to preheat the respective inflows of ambient air and fuel making up the mixture which is combusted. The fuel valve can be adjusted from the exterior while operating in closed and sealed condition, or a simulation of such condition, so that the proper circuit relationship of the valve and the igniter with which it is used can be set as a manufacturing procedure to eliminate need for field or installation adjustment.

8 Claims, 3 Drawing Figures

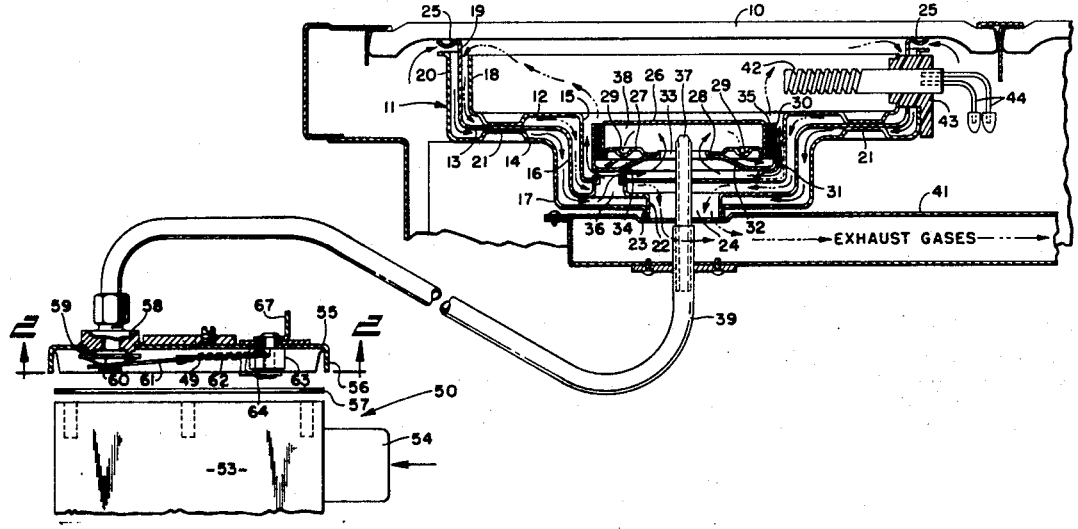

BLUE FLAME GAS SMOOTH TOP RANGE

This is a division, of application Ser. No. 432,547, filed Jan. 11, 1974, now U.S. Pat. No. 3,870,457 which is a continuation of Ser. No. 223,451, filed Feb. 4, 1972 abandoned.

BACKGROUND OF THE INVENTION

This invention relates to a closed or smooth top range in which a gas burning device provides the heat energy for cooking utensils placed on the top surface of the range and to a controlling system for the burner for providing variable heat output and safe and reliable operation.

This general type of range employs a smooth top, usually of glass ceramic material having a negligible temperature coefficient of expansion, and conventionally plural heating units, with four the most common arrangement. When the heating units are of gas type, a substantial quantity of heat is developed and accommodation must be made for dissipation of same either by way of a ducting system or more commonly by controlled venting into the kitchen area. Various expedients can be employed to achieve this function, including heat exchange between the exhaust gases and incoming air, which provides as well an increase in burner efficiency.

The thermal energy must be transmitted through an imperforate member, rather than directly to the utensil as in the common open burner configuration and heretofore the energy has been almost entirely radiant in using both electric and gas heaters. Further, consideration must be given to the spatial distribution of the source of the energy so as to attain effective transmission characteristics and avoid local hot spots and the like which can have a deleterious effect upon the top surface. Still further, inasmuch as a closed gas burning system is being employed, suitable safeguards must be provided for proper ignition on demand as well as for safe exhaust of the burned gases.

SUMMARY OF THE INVENTION

It is a principal object of this invention to provide an improved blue flame type burner assembly for a gas smooth top range in which thermal energy in the combustion chamber is controlled in a predetermined and advantageous manner.

It is another object of this invention to provide such a gas burner assembly which employs improved heat exchange between burned gases and incoming fuel and air.

It is still another object of this invention to provide an improved gas burner assembly which employs a glow type ignition system which contributes significantly to the thermal energy developed.

It is a still further object of this invention to provide a gas burner assembly having an improved interaction between such an igniter element and the fuel valve which is adaptable to production line manufacture.

It is a yet further object of this invention to provide a gas burner assembly which utilizes a variable duty cycle switching scheme for controlling thermal energy from the burner.

It is still another object of this invention to provide an improved electrically actuated, pre-adjusted valve assembly for use with such burner apparatus.

These and other objects of the invention are attained in the apparatus of the instant invention which includes a burner assembly, especially suited for support beneath an imperforate glass ceramic smooth top, having multiple stacked pans together forming an outer surrounding air intake, mixed gas/air passages and a burned gas outlet. These passages are arranged so that the burned gases routed through the assembly preheat the incoming air annd the gaseous fuel delivered to the burner for combustion.

A glow type igniter element is disposed in the combustion chamber of the burner for electrical ignition and is in series circuit connection with a thermal valve in the fuel line, the circuit being energized for heat control on a periodic basis by a variable duty cycle motor driven switch. The fuel valve is provided with adjustable means for pre-adjusting its response in relation to the particular igniter with which it is used.

Other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

BRIEF DESCRIPTION OF THE DRAWING

In said annexed drawing:

FIG. 1 is a vertical sectional view of a portion of a range showing a burner assembly in accordance with the invention;

FIG. 2 is a bottom view of the fuel valve cover as indicated by the lines 2—2 of FIG. 1; and FIG. 3 is a schematic diagram of the apparatus of the invention showing the electrical interconnection of components therein.

DESCRIPTION OF THE PREFERRED EMBODIMENT

Referring now to the drawing in detail there is shown in FIG. 1 a portion of a range embodying the teachings of this invention including a top 10 which is preferably a sheet of glass ceramic material which is imperforate and may be considered to have a zero temperature coefficient of expansion. The top 10 is the support surface for the range and utensils are placed thereon for heating purposes and conventionally more than one burner assembly may be disposed therebeneath, only a single one being described for purposes of this disclosure.

This burner assembly 11 comprises inner 12, middle 13 and outer 14 pans of light-weight sheet metal having, respectively, cylindrical center wells 15, 16, and 17 and peripheral vertical walls 18, 19, and 20. The diameters of the pans and their center wells are suitably dimensioned so that when stacked one within the other such pans form chambers therebetween for controlling the flow of gases through the assembly. The inner and outer pans are provided with inward offsets which opposingly engage the middle pan at a number of points as shown at 21 and are there joined by welding. Additionally, but not shown for convenience, the bottom of the middle well is preferably upset against and riveted to the bottom of the middle well at several points, all to provide proper spacing and a rigid and stable structure.

The wells 16, 17 of the middle and outer pans include central and downwardly disposed flanges 22, 23 which are nested one within the other and secured together by welding or staking to form a central chamber 24 in the burner assembly 11 for purposes to be described hereinafter.

The middle or main pan 12 includes a further outturned flange 25 at its outermost periphery which engages the underside of the top 10 of the range and forms a barrier between the lower terminating vertical walls 18 and 20 of the other two pans. An inverted cup 26 having a bottom closure 27 with an axial aperture 28 and plural circumferentially spaced bottom orifices 29 is fitted within an upright burner cup 30 supported on perforated and stepped ribs 31 formed interiorly about the inner pan well 15. Such burner pan is dished upwardly at 32 to engage the closure 27 and also provided with an axial opening 33 flanged through the aperture 28 of the closure and thereby holding the latter in upwardly spaced relation to define an annular chamber 34.

The vertical walls of the inverted cup 26 and burner pan 30 are radially spaced and between the two is a vertical orifice defining ring element 35 of corrugated metal, preferably stainless steel.

Several of the upsets of middle pan 13 which penetrate the bottom of the inner pan 12 are hollow, as shown at 36, to provide communication between the chamber formed by the middle and outer pans and the interior of the inner pan below the burner cup 30, which is as illustrated also spaced radially inwardly of the inner pan well 15. The upper ends or mouths of the annular chambers between the outer and middle pan and the middle and inner pan respectively to the side of middle wall 19 are unobstructed.

A heat tube 37 of stainless steel having an open top end orifice is positioned axially in the assembly thus far described and is employed to deliver the gaseous fuel for combustion to mixing chamber 38 within the inverted burner cup 26.

As shown by arrows in full line in FIG. 1, ambient air is directed to the mixing chamber 38 through the space between the outer and middle pans, the passages 36, the space beneath cup 30, and the center aperture 33 through which the heat tube extends about the same. The mixture proceeds, as shown by the dashed arrrows, from the chamber 38 outwardly through the port or orifice member 35 to be combusted at the annular top of the latter.

Additional ambient air proceeds, as secondary air to support such combustion, from beneath pan 30 within the inner well 15 upwardly through the vertical chamber between the two, as also shown by arrows in full line, with such secondary air thus delivered in controlled manner directly to the burner port or combustion area. A fuel pipe 39 is joined with the heat tube 37 to supply the gaseous fuel under pressure to the burner assembly 11.

The burner produces a high quality blue flame ring in a generally vertical upward direction or toward the top 10. The flame is warped outwardly somewhat by virtue of the fact that the assembly is powered by a blower 40 (FIG. 3) connected to the assembly by an exhaust duct 41 extending from the bottom center opening 24 formed by the pan flanges 22 and 23. The blower of course places the combustion chamber of the burner under negative pressure and causes an outflow radially of the burning and burned gas as shown by the dashed arrows to ultimate discharge at some suitable location relative to the range.

It is especially to be noted that the burned gases are exhausted from the combustion zone of the burner through the space between the inner and middle pans in heat transfer relation to the inflow of the ambient air over the other or outer side of the middle pan, warming the intake air in the process and cooling the burned gases, such effect occurring over a relatively large area determined by the overall diameter of the burner assembly 11 typically on the order of 8 inches and the rate of air movement through the respective chambers. Such heat transfer effect obtains throughout the full assembly to the bottom center discharge opening 24.

Moreover, in such routing of the burned gases the heat tube 37 is also contacted both in the assembly and in the exhaust duct 41 to preheat the fuel supplied by the tube. This preheating of both the fuel and air supplied to the burner assembly provides a well diffused fuel/gas mixture more conducive to ignition and assists in producing flame in the combustion chamber which efficiently utilizes the fuel supplied. Because of the negative pressure produced within the burner assembly 11 due to the partial vacuum created by the blower 40 a preferred configuration for the burning gases can be produced in the combustion chamber wherein the flame ring occurring about the periphery of the cup 26 is drawn over the wall 18 of the inner pan 12 substantially completely about the periphery thereof creating a flame wash at the underside of the top 10. This avoids the creation of local hotspots and the like which could be detrimental not only to the top 10 of the range but also the components forming the burner assembly.

Further while it is indicated that a negative pressure condition is preferable in the burner assembly 11 of this invention, such apparatus could be operable as well by appreciably raising the pressure of the fuel supplied by way of the heat tube 37, for example, by insertion of a suitable booster pump, not shown, in the fuel supply line. In such a positive pressure configuration no substantial difference is obtained in the configuration of the flame wash or in the heat transfer effects between the burned gases and incoming air and fuel inasmuch as the burner is a completely closed assembly except for the designated orifices provided for incoming air. The flow through the assembly can be adjusted in manufacture by including variable orifice means at some appropriate location, such as, at the outlet 24.

Further forming a portion of the burner assembly 11 is an electrical igniter unit 42 in the form of a glow coil element of solid state silicon carbide held supported in a ceramic spool 43 fitted into a notch in the pan walls 18–20. The glow element includes a pair of outer end conductors 44 for external circuit connection, with the coil itself projecting radially into the combustion chamber and its inner end proximate to the burner port member 35. A ballast coil 45 consisting of plural turns of resistance wire is shown in FIG. 3 as connected in series with the glow coil. The latter is preferably a Gas Igniter manufactured by The Carborundum Company, directly energizable from a conventional source of power and characterized in providing a high ignition temperature, very high reliability and a positive temperature coefficient of resistance at high temperature levels which provides a measure of self-regulation at operating temperatures. For purposes of the invention, however, it is preferred that the connector leads be directly applied by plasma spraying or an equivalent technique for comparable withstanding of the high temperatures to which the element is here subjected.

As further indicated in FIG. 3 such igniter element 42 and the ballast 45, if the latter is used, are connected by one line 46 to a source of power 47 and by a second line 48 to the heater element 49 of a thermal fuel valve 50, to be described, a variable duty cycle motor driven mechanical switch 51, a fuse, and an air switch 52. The air switch is located to respond to the negative pressure in the system when blower 40 is properly operating, as a safety interlock for the burner, the burner circuit not being shown, but obviously controlled by a main switch.

The mechanical switch 51 includes a motor driven cam and lever contact operated thereby to provide periodic closure of the switch over intervals determined by the rate of rotation of the drive motor and the eccentricity of the cam, the latter or any suitable equivalent thereof preferably being adjustable for selection of the duty cycle of operation. Thus when heat is desired from the burner assembly 11 the apparatus may be activated by energization of the drive motor for the mechanical switch 51, the completion of the circuit providing initiation of the blower 40 by way of the air switch 52 and energization of the igniter element 42 to raise the latter to ignition temperature. The configuration of the fuel valve 50 is selected to provide suitable delay in the actuation of same to prevent the delivery of fuel to the burner assembly 11 uuntil the glow element 42 has reached ignition temperature. Even after ignition has occurred the glow element is maintained in an energized condition producing a relatively high level of energy which supplements the thermal energy developed by burning of the gas mixture in the burner apparatus 11. When the mechanical switch 51 is opened breaking the circuit to the components both the fuel valve heater 49 and the igniter unit 42 will be deenergized and cooled preparatory to recycling the same.

The structure of the fuel valve 50 is seen in more detail in FIGS. 1 and 2 as consisting of a substantially rectangular housing 53 having a fuel inlet connector 54 mounted thereon. The cover plate 55 of the housing is of a configuration designed for external adjustment of the characteristics of the valve and comprises a sheet metal plate having a depending flange 56 adapted to fit over the body of the housing and to be secured thereto by a plurality of screws, a fluid-tight joint being provided by an apertured rectangular silicone gasket 57 inserted therein. A fuel outlet stud connector 58 is swaged or brazed onto the cover plate at one end and is adapted for communication with the fuel line 39 of the burner assembly, the inner portion of the stud connector having a raised ring 59 thereon forming a valve seat.

The valve closure element 60 is a resilient disc supported by a spring steel piece 61, in turn supported at one end of a bimetal blade 62, the other end of the latter being secured to the underside of the cover in a suitable mounting block 63 by means of a rivet 64. The resistance heater element 49 of the valve is a ribbon of flat wire insulatively wound on the bimetal blade and connected by eyelets 65, 66 to external mounting lugs 67 in electrical isolation from the cover plate 55. The mounting block for the bimetal blade is located adjacent the end of the cover plate remote from the outlet 58 and the arrangement of components is selected so that when the heater 49 is not energized the closure member 60 will be tightly biased against the valve seat 59 preventing the flow of fuel to the fuel line 39. Upon energization of the heater, a bending of the bimetal blade 62 will occur in the downward direction as viewed in FIG. 1 withdrawing the closure member from the valve seat and allowing the flow of fuel to the burner assembly 11. For purposes of this invention a SAFLEX type of bimetal blade is preferred, such component being manufactured by Square D Co. and characterized by having a reverse being action at lower ambient temperatures and the desired downward bending at a relatively fast rate at relatively high temperature levels. This mode of operation is advantageous during the cooling-off period of the burner assembly 11 in that a faster closure of the valve can be obtained allowing a higher recycling capability and, further, the reverse action of the bimetal at the low temperature level provides a firm and reliable seating force for the closure member 60.

Adjustment of the valve seating force and the interrelation between the operation of the latter and that of the igniter 42 is provided by an external adjustment device comprising a rigid strap 68 spanning the top of the cover plate 55 and firmly affixed thereto at the sides by welding or the like. A set screw 69 is threadably received in the central portion of the strap and is adapted to abut the cover plate 55 to cause deformation of same or a downward bending as viewed in FIG. 1, thereby relieving in part the closure pressure exerted by the blades 61, 62.

This pre-adjustment of the characteristics of operation of the fuel valve 50 is made in production of the assembly to insure proper operating relation between the particular igniter element 42 and the given associated fuel valve. Variation in current characteristics and operating temperatures of the igniter can therefore be compensated in production to eliminate any need for less desirable field adjustment, and it will of course be appreciated that the pre-adjustment is made under sealed operating condition of the valve.

The specific form of the igniter disclosed as preferred offers an appreciable level of energy and therefore acts as a pilot in the sense of insuring combustion when its energization circuit is intact and functioning properly. The Carborundum element may, for example, have a rating of about 300 watts equivalent roughly to 1,000 B.T.U. Another glow igniter made of molybdenum disilicide wire might be utilized similarly, with a rating of about 50 watts, and it is preferred for the above reason that not less than about 100 to 150 B.T.U. be provided by the igniter used.

It will also be apparent that other means for the desired pre-adjustment of the fuel valve, and valve forms as well, can be employed within the scheme for ignition and control of the burner heat output described in the foregoing.

The embodiments of the invention in which an enclusive property or privilege is claimed are defined as follows:

1. A gas burner assembly, comprising housing means having a mixing chamber, means for delivering a gaseous fuel and air to said mixing chamber for forming a combustible mixture therein, said mixing chamber having outlet port means for issue and blue flame combustion of such mixture, automatic valve means for controlling the delivery of the gaseous fuel to said mixing chamber, said valve means including a valve closure member, and electrical actuating means for operating said valve closure member to open and to close the same, and a glow type electric resistance igniter positioned to ignite the mixture issuing from said outlet port means, said igniter being operative to develop appreciable thermal energy and connected in circuit with said electrical actuating means for concurrent energization with the latter, said electrical actuating means including a thermally responsive member operatively connected to said valve closure member for opening and closing the same, and electric heater means for applying thermal heat to actuate said thermally responsive member, and means for pre-adjusting said actuating means to determine the response thereof with said valve closure member in condition capable of operation including means for applying a pre-load on said valve closure member and means for adjusting such pre-load to vary the responsiveness of said thermally responsive member for opening and closing said valve closure member, so that the response times of said automatic valve means and igniter are related in normal operation of said gas burner assembly such that said valve closure member remains closed until said igniter attains a temperature approximately at which ignition of the combustible mixture at the outlet port means occurs.

2. A gas burner assembly as set forth in claim 1, further comprising variable duty cycle controlling means for cyclically energizing said heater means and said igniter.

3. A gas burner assembly as set forth in claim 1 further comprising vent means for removal and discharge of the burned gases, and fluid impelling means for maintaining a higher than normal pressure difference between said outlet port means and said vent means, decreasing relatively from said outlet port means to said vent means.

4. A gas burner assembly as set forth in claim 1, wherein said housing means defines a combustion chamber cooperably with an imperforate smooth top for supporting cooking utensils.

5. A gas burner assembly as set forth in claim 1, wherein said housing means includes an inlet for ambient air delivery to said mixing chamber, and said vent means includes a burned gas passageway in heat transfer relation to said air inlet.

6. A gas burner assembly as set forth in claim 1, wherein said means for applying a pre-load on said valve closure member comprises a support for one end of said thermally responsive member, and means for causing limited movement of said support to vary the angle at which said thermally responsive member extends from said support for varying the pre-load applied to said valve closure member by said thermally responsive member.

7. A gas burner assembly as set forth in claim 1, wherin the igniter is made of a material having the characteristics of silicon carbide.

8. A gas burner assembly, comprising housing means having a mixing chamber, means for delivering a gaseous fuel and air to said mixing chamber for forming a combustible mixture therein, said mixing chamber having outlet port means for issue and blue flame combustion of such mixture, automatic valve means for controlling the delivery of the gaseous fuel to said mixing chamber, said valve means comprising a housing having an inlet and an outlet orifice, a valve element normally spring biased closing against said orifice by a support including a heat warpable section, a resistance heater for warping the support to move the element away from the orifice and thereby open the same, said housing enclosing the valve element and its support in fluid tight relation and open only at said inlet and said orifice, and means operable from the exterior of said housing for adjusting the normal orifice closing force of the element with the housing in such closed condition and thus without diminishing the fluid tight integrity of said housing during such adjustment, and an electric resistance igniter positioned to ignite the mixture issuing from said outlet port means, said igniter being operative to develop appreciable thermal energy and connected in circuit with said resistance heater for concurrent energization with the latter.

* * * * *